US009428101B2

(12) United States Patent
Takagimoto et al.

(10) Patent No.: US 9,428,101 B2
(45) Date of Patent: Aug. 30, 2016

(54) LIGHT EMITTING ELEMENT DRIVING DEVICE, LIGHT EMITTING DEVICE, AND VEHICLE

(71) Applicant: Rohm Co., Ltd., Kyoto (JP)

(72) Inventors: Shinsuke Takagimoto, Kyoto (JP); Yoshiyuki Nakatani, Kyoto (JP); Shigenori Kawase, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/933,148

(22) Filed: Nov. 5, 2015

(65) Prior Publication Data

US 2016/0121783 A1    May 5, 2016

(30) Foreign Application Priority Data

Nov. 5, 2014 (JP) .................................. 2014-225227

(51) Int. Cl.
| | | |
|---|---|---|
| *H05B 37/00* | (2006.01) | |
| *B60Q 1/00* | (2006.01) | |
| *H05B 33/08* | (2006.01) | |

(52) U.S. Cl.
CPC ............ *B60Q 1/0094* (2013.01); *H05B 33/083* (2013.01); *H05B 33/089* (2013.01); *H05B 33/0896* (2013.01)

(58) Field of Classification Search
CPC ............ H05B 33/083; H05B 33/0815; H05B 33/0884; H05B 33/0851
USPC .......................................... 315/82, 122, 193
See application file for complete search history.

(56) References Cited

U.S. PATENT DOCUMENTS

| | | | | |
|---|---|---|---|---|
| 2010/0134018 A1* | 6/2010 | Tziony ................. | H05B 33/083 | |
| | | | 315/122 | |
| 2011/0121741 A1* | 5/2011 | Yamamoto ........... | G09G 3/3406 | |
| | | | 315/193 | |
| 2012/0074845 A1 | 3/2012 | Aoki et al. | | |
| 2012/0181931 A1* | 7/2012 | Katsura ................. | B60Q 11/005 | |
| | | | 315/82 | |
| 2012/0223649 A1* | 9/2012 | Saes ...................... | H05B 33/083 | |
| | | | 315/186 | |
| 2013/0313973 A1* | 11/2013 | DeNicholas ......... | H05B 33/089 | |
| | | | 315/122 | |
| 2014/0055050 A1* | 2/2014 | Chu .................... | H05B 33/0824 | |
| | | | 315/193 | |
| 2014/0239851 A1 | 8/2014 | Aoki et al. | | |
| 2014/0306614 A1* | 10/2014 | Pan ..................... | H05B 33/0824 | |
| | | | 315/193 | |
| 2014/0368798 A1* | 12/2014 | Gyoten .............. | G03B 21/2053 | |
| | | | 353/85 | |
| 2015/0163871 A1* | 6/2015 | Takeshi ................. | B60Q 11/00 | |
| | | | 315/82 | |
| 2016/0079865 A1* | 3/2016 | Yamaji .............. | H02M 3/33507 | |
| | | | 315/122 | |

FOREIGN PATENT DOCUMENTS

JP        2012-71712      4/2012

* cited by examiner

*Primary Examiner* — Don Le
(74) *Attorney, Agent, or Firm* — Fish & Richardson P.C.

(57) ABSTRACT

A light emission driving device includes an output voltage supply unit arranged to generate an output voltage from an input voltage so as to supply the output voltage to a load, a determination unit arranged to determine whether or not a ground fault due to abnormality may have occurred on the basis of an anode voltage of the load, and a signal output unit arranged to externally output a signal indicating that a ground fault due to abnormality may have occurred when the determination unit determines that a ground fault due to abnormality may have occurred. The output voltage supply unit does not perform generation stop of the output voltage by a trigger of determination by the determination unit that a ground fault due to abnormality may have occurred.

11 Claims, 7 Drawing Sheets

LIGHT EMITTING ELEMENT DRIVING DEVICE, LIGHT EMITTING DEVICE, AND VEHICLE

CROSS-REFERENCE TO RELATED APPLICATIONS

This nonprovisional application claims priority under 35 U.S.C. §119(a) on Patent Application No. 2014-225227 filed in Japan on Nov. 5, 2014, the entire contents of which are hereby incorporated by reference.

BACKGROUND OF THE INVENTION

1. Field of the Invention

The present invention relates to a light emitting element driving device arranged to drive a light emitting element, and a light emitting device and a vehicle using the light emitting element driving device.

2. Description of Related Art

A light emitting device including a series connected body constituted of a plurality of light emitting diodes is used for a headlight of a vehicle, for example. In order to realize an adaptive front-lighting system (AFS) or an adaptive driving beam (ADB) when the light emitting device is used for a headlight of a vehicle, it is preferred to dispose short-circuiting switches respectively in parallel with the light emitting elements of the series connected body and to turn on and off the short-circuiting switches so that the number of turned-on light emitting diodes can be controlled.

The light emitting device including the series connected body constituted of a plurality of light emitting diodes, in which the number of turned-on light emitting diodes can be controlled by turning on and off the short-circuiting switches, usually includes separately a substrate on which a light emitting element driver IC is mounted and a substrate on which the series connected body constituted of a plurality of light emitting diodes, the short-circuiting switches, and a switch controller arranged to control the short-circuiting switches are mounted, and hence the light emitting element driver IC and the switch controller cannot be synchronized with each other in general. For this reason, in order to set the number of turned-on light emitting diodes to zero, it is common that the switch controller turns on all the short-circuiting switches.

A light emitting device usually has a ground fault protection function (see, for example, JP-A-2012-71712), and an output of the light emitting element driver IC is stopped when a ground fault is detected.

However, in the light emitting device including the series connected body constituted of a plurality of light emitting diodes, in which the number of turned-on light emitting diodes can be controlled by turning on and off the short-circuiting switches, when the number of turned-on light emitting diodes is set to zero, a short circuit similar to a ground fault due to abnormality is formed by the short-circuiting switches. For this reason, when the ground fault protection function is mounted in the light emitting device including the series connected body constituted of a plurality of light emitting diodes, in which the number of turned-on light emitting diodes can be controlled by turning on and off the short-circuiting switches, unless the light emitting element driver IC recognizes the control content of the switch controller, the case of setting the number of turned-on light emitting diodes to zero may be misdetected as a ground fault due to abnormality so that the protection may be performed.

SUMMARY OF THE INVENTION

It is an object of the present invention to provide a light emitting element driving device that can prevent misdetection of a ground fault due to abnormality and protection against the same when all the light emitting elements are turned off, and a light emitting device and a vehicle using the light emitting element driving device.

In order to achieve the above-mentioned object, a light emitting element driving device according to the present invention includes a reset signal generator arranged to generate a reset signal in accordance with current flowing in a load including a series connected body constituted of a plurality of light emitting elements and short-circuiting switches disposed respectively in parallel with the light emitting elements of the series connected body, a set signal generator arranged to generate a set signal in accordance with an anode voltage of the load, an output voltage supply unit arranged to generate an output voltage from an input voltage in accordance with the reset signal and the set signal so as to supply the output voltage to the load, a determination unit arranged to determine whether or not a ground fault due to abnormality may have occurred on the basis of the anode voltage of the load, and a signal output unit arranged to externally output a signal indicating that a ground fault due to abnormality may have occurred when the determination unit determines that a ground fault due to abnormality may have occurred. The output voltage supply unit does not perform generation stop of the output voltage by a trigger of determination by the determination unit that a ground fault due to abnormality may have occurred.

Meanings and effects of the present invention will become more apparent from the description of embodiments given below. However, the following embodiments are merely examples of the present invention, and meanings of the present invention and terms of elements are not limited to those described in the following embodiments.

DETAILED DESCRIPTION OF THE PREFERRED EMBODIMENTS

First Embodiment

Figure 1:
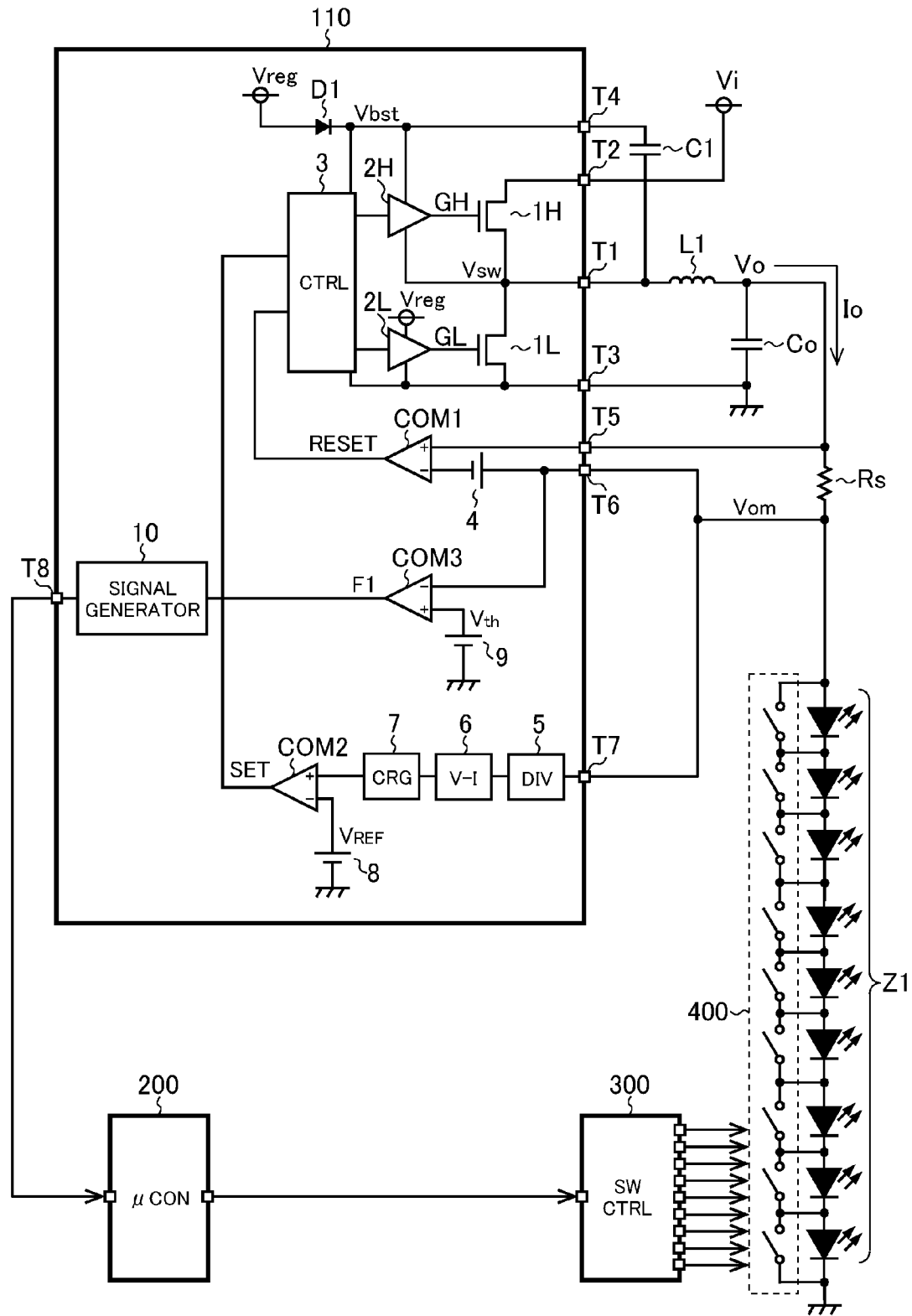
FIG. 1 is a diagram showing a light emitting device of a first embodiment.

FIG. 1 is a diagram showing a light emitting device of a first embodiment. The light emitting device of the first embodiment includes a series connected body Z1 constituted of a plurality of light emitting elements (light emitting diodes in FIG. 1), a light emitting element driver IC 110 arranged to drive the series connected body Z1, a coil L1, an output capacitor Co, a sense resistor Rs, a capacitor C1, a microcomputer 200, a switch controller 300, and a switch circuit 400 constituted of short-circuiting switches disposed respectively in parallel with the light emitting elements of the series connected body Z1.

The light emitting element driver IC 110 is a semiconductor integrated circuit device (so-called LED driver IC) including an N-channel MOS field-effect transistors 1H and 1L (hereinafter referred to as an upper transistor 1H and a lower transistor 1L), an upper driver 2H and a lower driver 2L, a diode D1, a controller 3, constant voltage sources 4 and 9, comparators COM1 to COM3, a voltage divider circuit 5, a voltage-current conversion circuit 6, a charge part 7, a reference voltage source 8, and a signal generator 10. In addition, the light emitting element driver IC 110 has external terminals T1 to T8 arranged to establish electric connection with outside. Note that the circuit elements in the light emitting element driver IC 110 may be partially replaced by external elements.

Outside the light emitting element driver IC 110, the external terminal T2 is connected to an application terminal of an input voltage Vi. The external terminal T1 is connected to a first terminal of the coil L1. A second terminal of the coil L1 (application terminal of an output voltage Vo) is connected to a first terminal of the sense resistor Rs. A second terminal of the sense resistor Rs is connected to a first terminal (anode) of a load including the series connected body Z1 and the switch circuit 400. A second terminal (cathode) of the load including the series connected body Z1 and the switch circuit 400 is connected to a ground terminal. A first terminal of the output capacitor Co is connected to the second terminal of the coil L1. A second terminal of the output capacitor Co is connected to the ground terminal. The external terminal T3 is connected to the ground terminal. The external terminal T4 is connected to the first terminal of the coil L1 via the capacitor C1. The external terminal T5 is connected to the first terminal of the sense resistor Rs. The external terminals T6 and T7 are connected to the first terminal (anode) of the load including the series connected body Z1 and the switch circuit 400. The external terminal T8 is connected to an external terminal of the microcomputer 200.

Inside the light emitting element driver IC 110, a drain of the upper transistor 1H is connected to the external terminal T2. A source of the upper transistor 1H is connected to the external terminal T1. A gate of the upper transistor 1H is connected to an output terminal of the upper driver 2H. A drain of the lower transistor 1L is connected to the external terminal T1. A source of the lower transistor 1L is connected to the external terminal T3. A gate of the lower transistor 1L is connected to an output terminal of the lower driver 2L. In other words, the upper transistor 1H and the lower transistor 1L are connected in series between the application terminal of the input voltage Vi and the ground terminal, and a connection node thereof (application terminal of a switch voltage Vsw) is connected to the output capacitor Co via the coil L1.

The upper driver 2H generates a control signal GH of the upper transistor 1H on the basis of an instruction from the controller 3. The upper transistor 1H becomes on when the control signal GH is high level and becomes off when the control signal GH is low level. The lower driver 2L generates a control signal GL of the lower transistor 1L on the basis of an instruction from the controller 3. The lower transistor 1L becomes on when the control signal GL is high level and becomes off when the control signal GL is low level.

The diode D1 and the capacitor C1 connected externally to the light emitting element driver IC 110 constitute a bootstrap circuit. The bootstrap circuit generates a boost voltage Vbst. An anode of the diode D1 is connected to an application terminal of a constant voltage Vreg. A cathode of the diode D1 is connected to the external terminal T4.

A first power supply terminal of the upper driver 2H and a first power supply terminal of the controller 3 are connected to the external terminal T4 (application terminal of the boost voltage Vbst). A second power supply terminal of the upper driver 2H is connected to the external terminal T1 (application terminal of the switch voltage Vsw). Accordingly, the high level of the control signal GH applied to the gate of the upper transistor 1H is the boost voltage Vbst, and the low level of the control signal GH is the switch voltage Vsw.

A first power supply terminal of the lower driver 2L is connected to the application terminal of the constant voltage Vreg. A second power supply terminal of the lower driver 2L is connected to the external terminal T3 (application terminal of a ground voltage GND). Accordingly, the high level of the control signal GL applied to the gate of the lower transistor 1L is the constant voltage Vreg, and the low level of the control signal GL is the ground voltage GND.

An operation of the bootstrap circuit having the above-mentioned structure is described. When the upper transistor 1H is turned off while the lower transistor 1L is turned on, in a state where the switch voltage Vsw is low level (GND), current flows from the application terminal of the constant voltage Vreg into the capacitor C1 via the diode D1 so that the capacitor C1 is charged. In this case, the boost voltage Vbst is substantially equal to the constant voltage Vreg (more precisely, is equal to a value (Vreg−Vf) obtained by subtracting a forward voltage drop Vf of the diode D1 from the constant voltage Vreg).

On the other hand, in a state where the capacitor C1 is charged, when the upper transistor 1H is turned on while the lower transistor 1L is turned off, the switch voltage Vsw is changed from low level (GND) to high level (Vi). Then, the boost voltage Vbst is further increased to a value (Vi+Vreg) that is higher than the high level (Vi) of the switch voltage Vsw by a charge voltage (substantially Vreg) of the capacitor C1. When this boost voltage Vbst is applied to the first power supply terminal of the upper driver 2H, the upper transistor 1H can be securely on/off controlled.

The comparator COM1 outputs a reset signal RESET to be high level when a voltage obtained by adding a voltage across the sense resistor Rs to the constant voltage of the constant voltage source 4 exceeds a predetermined value, and otherwise outputs the reset signal RESET to be low level. Accordingly, when output current Io flowing in the series connected body Z1 and the switch circuit 400 exceeds a threshold value, the reset signal RESET output from the comparator COM1 rises, and just after that, the output current Io is decreased so that the reset signal RESET drops.

The voltage divider circuit 5 divides an anode voltage Vom of the load including the series connected body Z1 and the switch circuit 400 and supplies the divided voltage to the voltage-current conversion circuit 6. The voltage-current conversion circuit 6 generates current corresponding to the divided voltage of the anode voltage Vom of the load including the series connected body Z1 and the switch circuit 400, and supplies the current to the charge part 7. The charge part 7 charges the current (charge) supplied from the voltage-current conversion circuit 6. Further, if the anode voltage Vom of the load including the series connected body Z1 and the switch circuit 400 is low, unlike this example, it is possible to adopt a structure in which the voltage divider circuit 5 is not disposed, and the anode voltage Vom of the load including the series connected body Z1 and the switch circuit 400 is supplied to the voltage-current conversion circuit 6.

When the charge voltage of the charge part 7 exceeds a reference voltage $V_{REF}$ output from the reference voltage source 8, a set signal SET output from the comparator COM2 rises, and just after that, the charge part 7 is discharged by the discharge circuit (not shown in FIG. 1) so that the set signal SET drops, and after that, the reset signal RESET output from the comparator COM1 rises so that the discharge of the charge part 7 by the discharge circuit (not shown in FIG. 1) is finished.

The controller 3 drives the upper driver 2H and the lower driver 2L so as to turn on and off the upper transistor 1H and the lower transistor 1L in accordance with the reset signal RESET output from the comparator COM1 and the set signal SET output from the comparator COM2. In this way, a connection node voltage (the switch voltage Vsw) of the upper transistor 1H and the lower transistor 1L is generated.

When the set signal SET rises, the controller 3 turns on the upper transistor 1H and turns off the lower transistor 1L. In addition, when the reset signal RESET rises, the controller 3 turns off the upper transistor 1H and turns on the lower transistor 1L.

In the light emitting device having the above-mentioned structure as shown in FIG. 1, the off-time circuit that determines an off-time $t_{OFF}$ as a low level period of the switch voltage Vsw is constituted of the voltage divider circuit 5, the voltage-current conversion circuit 6, the charge part 7, the comparator COM2, and the reference voltage source 8, and does not use an RC integration circuit that is usually used as the off-time circuit. For this reason, the off-time $t_{OFF}$ can be expressed by the following equation (1) and is not affected by transient characteristics of the RC integration circuit. Accordingly, it is possible to reduce a variation of an average value of the output current To due to a variation of the anode voltage Vom of the load including the series connected body Z1 and the switch circuit 400 (ideally, a variation of the average value of the output current To can be suppressed). Note that C and I in the following equation (1) respectively denote a capacitance of the charge part 7 and current output from the voltage-current conversion circuit 6.

$$t_{OFF} = \frac{C}{I} \times V_{REF} \quad (1)$$

Figure 2:
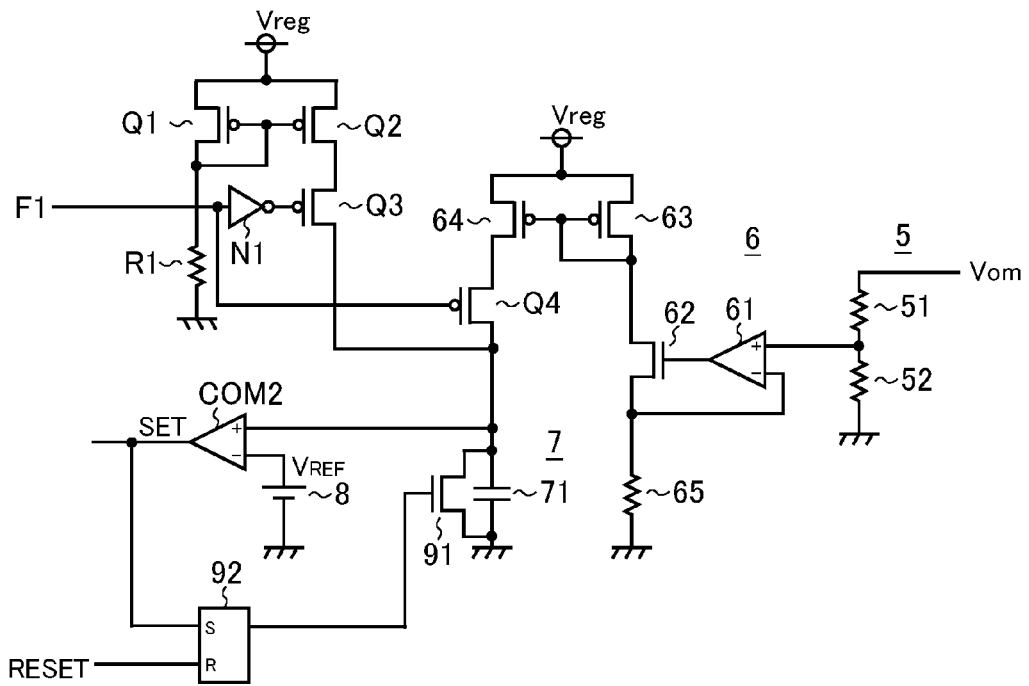
FIG. 2 is a diagram showing an example of an off-time circuit.

FIG. 2 is a diagram showing an example of the off-time circuit constituted of the voltage divider circuit 5, the voltage-current conversion circuit 6, the charge part 7, the comparator COM2, and the reference voltage source 8.

The voltage divider circuit 5 is constituted of a resistors 51 and 52 so as to divide the anode voltage Vom of the load including the series connected body Z1 and the switch circuit 400.

The voltage-current conversion circuit 6 includes an amplifier 61, an N-channel MOS field-effect transistor 62, P-channel MOS field-effect transistors 63 and 64, a resistor 65, P-channel MOS field-effect transistors Q1 to Q4, a resistor R1, and a NOT circuit N1. The amplifier 61 and the transistor 62 generate current I1 corresponding to the divided voltage of the anode voltage Vom of the load including the series connected body Z1 and the switch circuit 400, and the current I1 flows into the ground terminal via the resistor 65.

The transistors 63 and 64 constitute a current mirror circuit. In addition, the transistors Q1 and Q2 also constitute a current mirror circuit. A drain of the transistor Q1 is connected to the ground terminal via the resistor R1, and a drain of the transistor Q2 is connected to a first terminal of s capacitor 71 via the transistor Q3. In addition, the transistor Q4 is connected between a drain of the transistor 64 and the first terminal of the capacitor 71. Further, an output terminal of the comparator COM3 is connected to a gate of the transistor Q3 via the NOT circuit N1, and the output terminal of the comparator COM3 is connected directly to a gate of the transistor Q4.

Accordingly, when a flag F1 output from the comparator COM3 is high level, the transistor Q3 is turned on while the transistor Q4 is turned off, so that the capacitor 71 is charged by current output from the current mirror circuit constituted of the transistors Q1 and Q2. On the other hand, when the flag F1 output from the comparator COM3 is low level, the transistor Q3 is turned off while the transistor Q4 is turned on, and hence the current mirror circuit constituted of the transistors 63 and 64 generates current I2 proportional to the current I1 (the current I2 corresponding to the divided voltage of the anode voltage Vom of the load including the series connected body Z1 and the switch circuit 400). Then, the current I2 is supplied to the capacitor 71 as the charge part 7 so that the capacitor 71 is charged.

FIG. 2 also shows a discharge circuit constituted of an N-channel MOS field-effect transistor 91 and an SR flip-flop 92.

A drain of the transistor 91 is connected to a first terminal of the capacitor 71 (connection terminal with the transistor 64), and a source of the transistor 91 is connected to a second terminal of the capacitor 71 (ground terminal).

A set terminal of the SR flip-flop 92 is supplied with the set signal SET output from the comparator COM2, and a reset terminal of the SR flip-flop 92 is supplied with the reset signal RESET output from the comparator COM1. An output signal of the SR flip-flop 92 is supplied to a gate of the transistor 91. In this way, the transistor 91 is turned on so that the capacitor 71 is discharged just after the set signal SET rises, and after that, the discharge of the capacitor 71 continues until the reset signal RESET rises.

Figure 3:
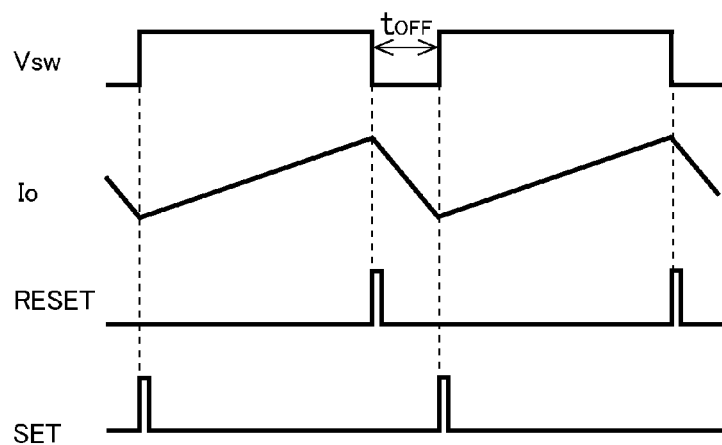
FIG. 3 is a timing chart for explaining an operation example of a light emitting device of the first embodiment.

FIG. 3 is a timing chart for explaining an operation example of the light emitting device of the first embodiment, in which the switch voltage Vsw, the output current Io, the reset signal RESET, and the set signal SET are shown in this order from the upper side.

Here, with reference to FIG. 1 again, description of the light emitting element driver IC 110 is continued. The light emitting element driver IC 110 further includes a determination circuit constituted of the comparator COM3 and a constant voltage source 9. In the determination circuit constituted of the comparator COM3 and the constant voltage source 9, when the anode voltage Vom of the load including the series connected body Z1 and the switch circuit 400 falls below an output voltage Vth of the constant voltage source 9, the flag F1 output from the comparator COM3 becomes high level indicating that a ground fault due to abnormality may have occurred. When the anode voltage Vom of the load including the series connected body Z1 and the switch circuit 400 exceeds the output voltage Vth of the constant voltage source 9, the flag F1 output from the comparator COM3 becomes low level indicating that there is no possibility of a ground fault due to abnormality.

When the flag F1 output from the comparator COM3 is low level, the signal generator 10 generates a signal indicating that there is no possibility of a ground fault due to abnormality and outputs the signal to the outside of the light emitting element driver IC 110 via the external terminal T8. When the flag F1 output from the comparator COM3 is high level, the signal generator 10 generates a signal indicating that a ground fault due to abnormality may have occurred and outputs the signal to the outside of the light emitting element driver IC 110 via the external terminal T8.

Figure 4:
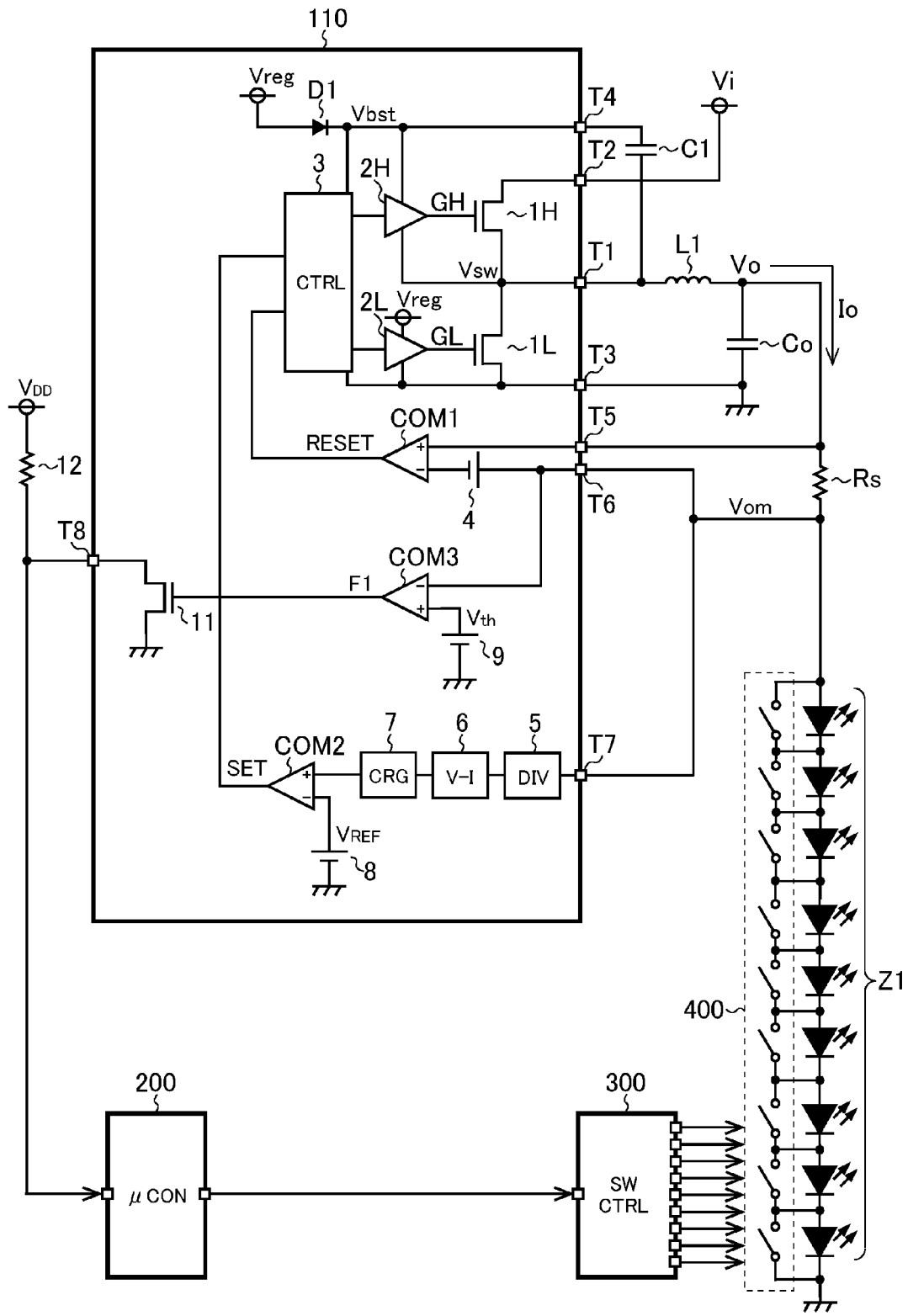
FIG. 4 is a diagram showing an example of a signal generator of the light emitting device of the first embodiment.

As the signal generator 10, it is possible to use, for example, an open drain circuit constituted of a transistor 11 and a pull-up resistor 12 as shown in FIG. 4. When the flag F1 is low level, the transistor 11 is turned off, and hence the signal output from the external terminal T8 becomes high level. On the other hand, when the flag F1 is high level, the transistor 11 is turned on, and hence the signal output from the external terminal T8 becomes low level. Accordingly, in the circuit structure shown in FIG. 4, the signal output from the external terminal T8 to be supplied to the microcomputer 200 becomes the signal indicating that a ground fault due to abnormality may have occurred when it is low level, while it becomes the signal indicating that there is no possibility of a ground fault due to abnormality when it is high level.

The microcomputer 200 transmits information about the light emitting diode to be turned on to the switch controller 300. The switch controller 300 controls on and off of each switch of the switch circuit 400 on the basis of the information transmitted from the microcomputer 200. Accordingly, the microcomputer 200 recognizes whether or not all the switches of the switch circuit 400 are turned on. Accordingly, when the signal indicating that a ground fault due to abnormality may have occurred is transmitted from the external terminal T8 of the light emitting element driver IC 110, the microcomputer 200 performs the ground fault protection unless all the switches of the switch circuit 400 are turned on. It is not limited how to perform the ground fault protection, but for example, the microcomputer 200 can control enable/disable of the light emitting element driver IC 110 and disables the light emitting element driver IC 110 when performing the ground fault protection.

As described above, the light emitting element driver IC 110 does not perform generation stop of the output voltage Vo by a trigger of the flag F1 being high level indicating that ground fault due to abnormality may have occurred, and hence it is possible to prevent misdetection of a ground fault due to abnormality and to perform the protection when all the switches of the switch circuit 400 are turned on. In this way, when all the switches of the switch circuit 400 are turned on, the light emitting element driver IC 110 does not cause OFF latch or restart.

Second Embodiment

Figure 5:
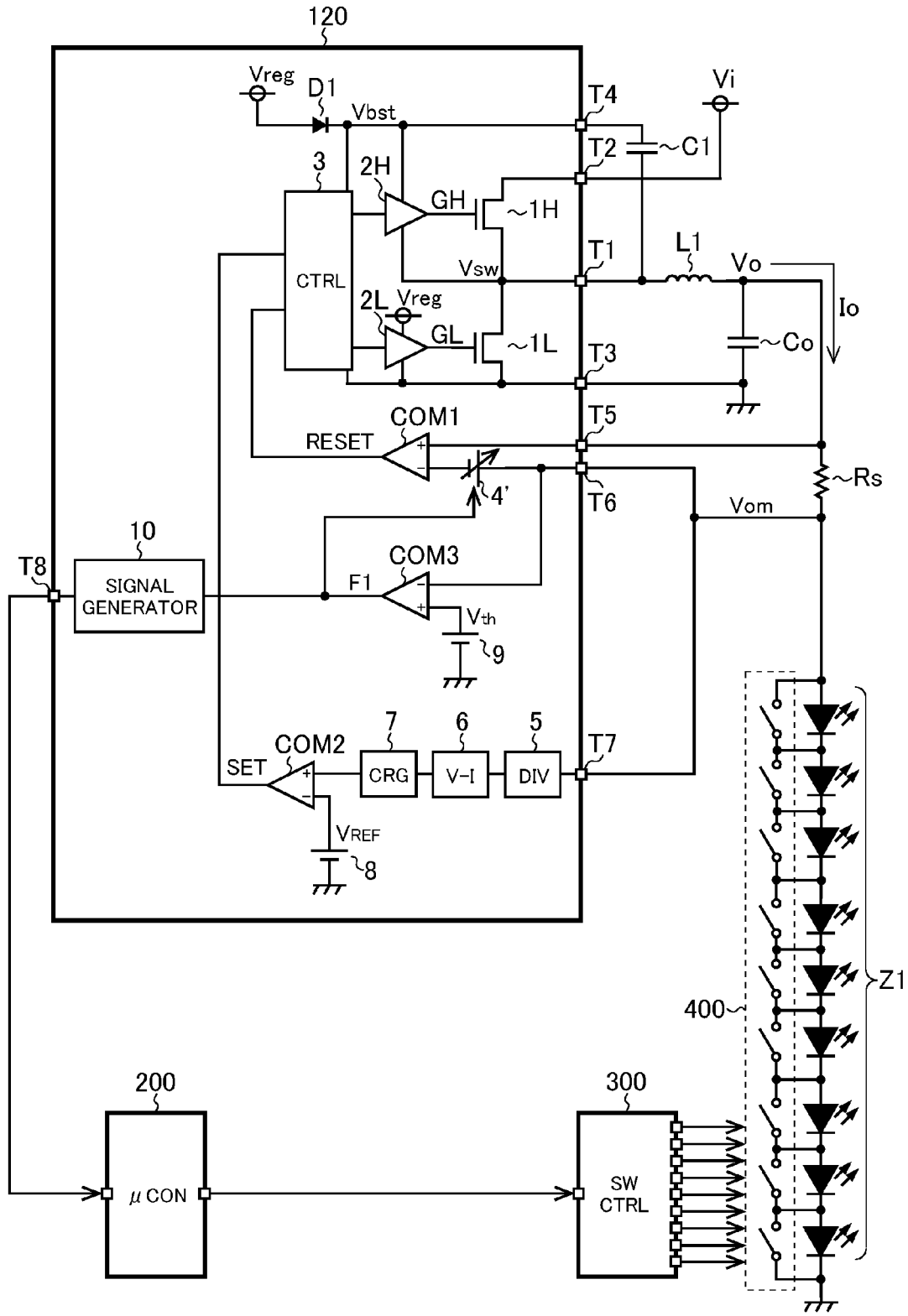
FIG. 5 is a diagram showing a light emitting device of a second embodiment.

FIG. 5 is a diagram showing a light emitting device of a second embodiment. Note that in FIG. 5, the same part as in FIG. 1 is denoted by the same numeral, and detailed description thereof is omitted.

The light emitting device of the second embodiment has a structure in which the light emitting element driver IC 110 is replaced by a light emitting element driver IC 120 in the light emitting device of the first embodiment. The light emitting element driver IC 120 has a structure in which the constant voltage source 4 is replaced by a variable voltage source 4' in the light emitting element driver IC 110.

The variable voltage source 4' outputs an output voltage that is higher when the flag F1 is low level than when the flag F1 is high level. In this way, when the flag F1 is high level, the average value of the output current Io flowing in the load including the series connected body Z1 and the switch circuit 400 can be reduced. For instance, an output voltage of the variable voltage source 4' should be adjusted so that the average value of the output current Io when the flag F1 is high level becomes approximately ⅒ of the average value of the output current Io when the flag F1 is low level.

By this operation, it is possible to prevent occurrence of overshoot of the output current Io or an increase of heating in the switch circuit 400 when the flag F1 is high level.

When the flag F1 is high level, accuracy of the output current Io does not particularly matter. However, if the average value of the output current Io is decreased, the off-time $t_{OFF}$ may not be generated. Accordingly, in this embodiment too, similarly to the first embodiment, the set signal is forcibly raised by using the off-time circuit shown in FIG. 2.

Third Embodiment

Figure 6:
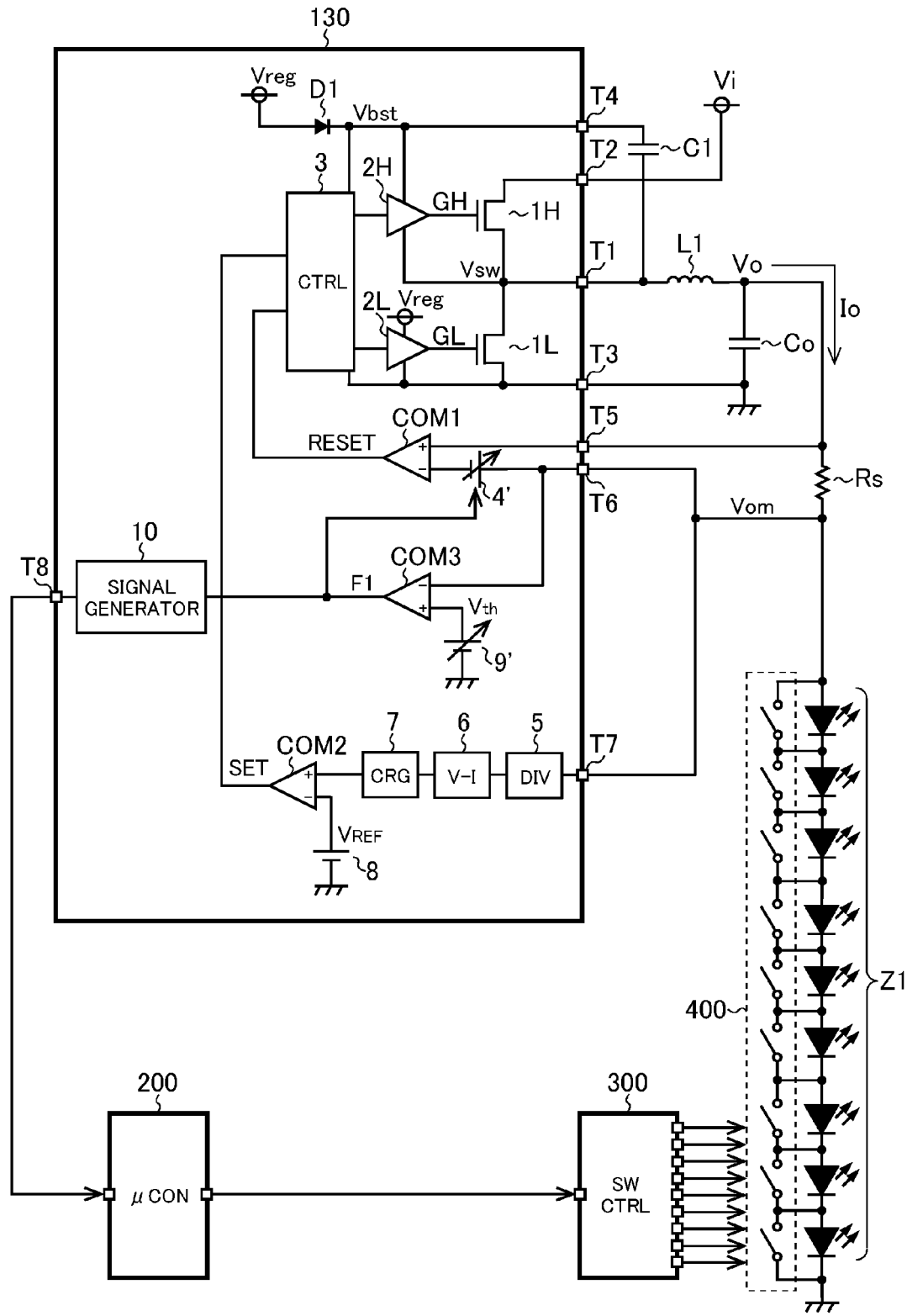
FIG. 6 is a diagram showing a light emitting device of a third embodiment.

FIG. 6 is a diagram showing a light emitting device of a third embodiment. Note that in FIG. 6, the same part as in FIG. 5 is denoted by the same numeral, and detailed description thereof is omitted.

The light emitting device of the third embodiment has a structure in which the light emitting element driver IC 120 is replaced by a light emitting element driver IC 130 in the light emitting device of the second embodiment. The light emitting element driver IC 130 has a structure in which the constant voltage source 9 is replaced by a variable voltage source 9' in the light emitting element driver IC 120.

A voltage output from the variable voltage source 9' is adjusted to be lower than the anode voltage Vom of the load including the series connected body Z1 and the switch circuit 400 when only one of the light emitting diodes in the series connected body Z1 is turned on, and to be higher than the anode voltage Vom of the load including the series connected body Z1 and the switch circuit 400 when all the light emitting diodes in the series connected body Z1 are turned off. The constant voltage source 9 may be used similarly to the first embodiment or the second embodiment, as long as the voltage, which is lower than the anode voltage Vom of the load including the series connected body Z1 and the switch circuit 400 when only one of the light emitting diodes in the series connected body Z1 is turned on and is higher than the anode voltage Vom of the load including the series connected body Z1 and the switch circuit 400 when all the light emitting diodes in the series connected body Z1 are turned off, is obtained. However, it is preferred to use the variable voltage source 9' for adjusting the voltage because there is a variation among forward voltage drops of the light emitting diodes in the series connected body Z1. Further, the adjusting method of the output voltage Vth of the variable voltage source 9' is not particularly limited. For instance, a part of the variable voltage source 9' is constituted of an external resistor, and the output voltage Vth of the variable voltage source 9' can be adjusted by a resistance value of the external resistor.

<Use>

Figure 7:
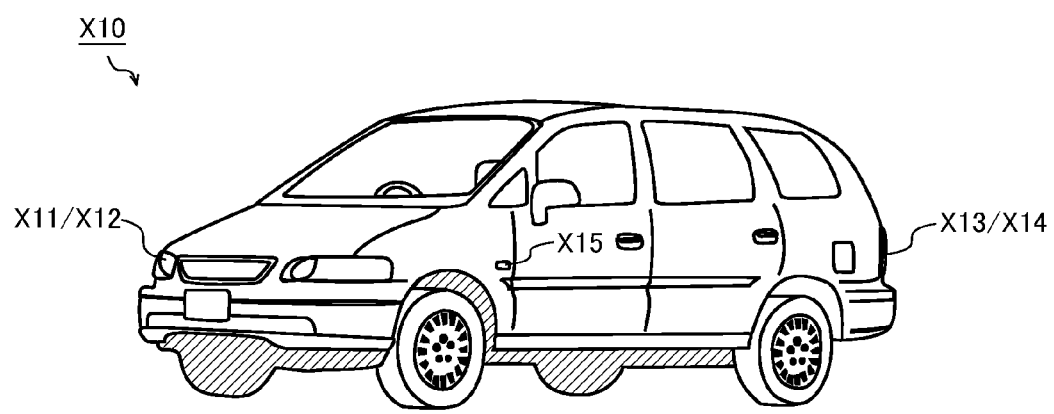
FIG. 7 is an external view (front side) of a vehicle in which the light emitting device is mounted.
Figure 8:
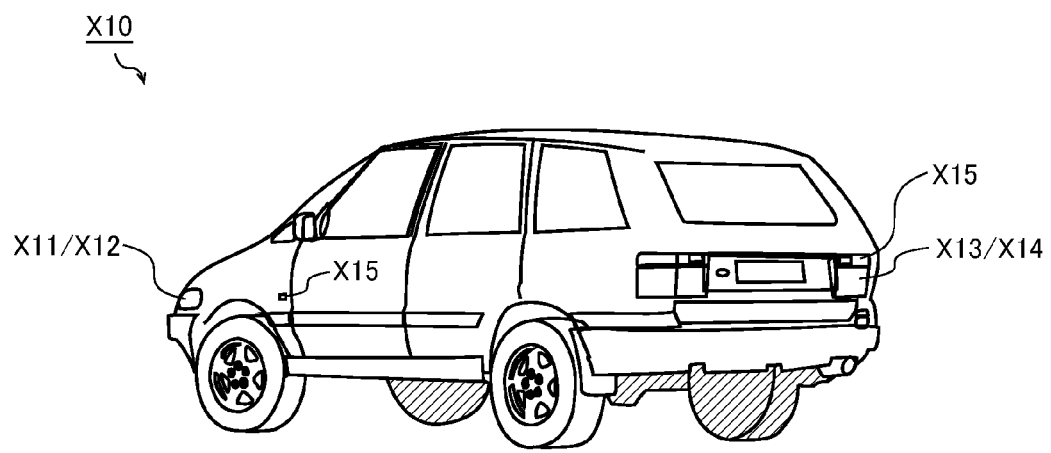
FIG. 8 is an external view (rear side) of the vehicle in which the light emitting device is mounted.

As shown in FIGS. 7 and 8, the light emitting device of each embodiment described above can be appropriately used for a headlight X11 (including, appropriately, a high beam lamp, a low beam lamp, a small lamp, a fog lamp, and the like) of a vehicle X10, a light source X12 as a daytime and night running lamp (DRL), a tail lamp X13 (including, appropriately, a small lamp, a back lamp, and the like), a stop lamp X14, a turn lamp X15, and the like, for example.

Figure 9:
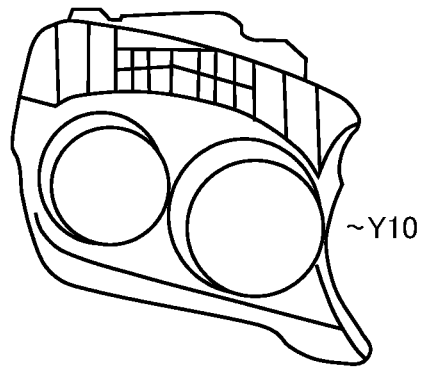
FIG. 9 is an external view of an LED headlight module.
Figure 10:
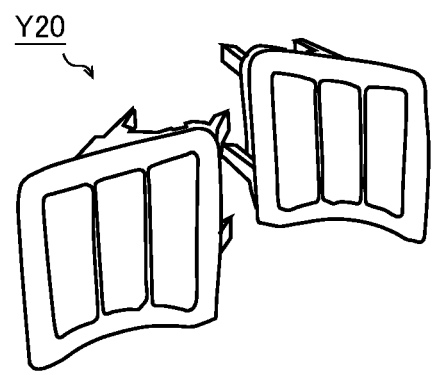
FIG. 10 is an external view of an LED turn lamp module.
Figure 11:
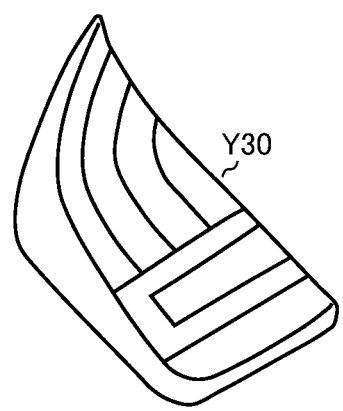
FIG. 11 is an external view of an LED rear lamp module.

Further, the light emitting element driver ICs 110 to 130 may be provided as modules (an LED headlight module Y10 of FIG. 9, an LED turn lamp module Y20 of FIG. 10, an LED rear lamp module Y30 of FIG. 11, and the like) together with the external components (the output capacitor Co, the capacitor C1, the coil L1, the sense resistor Rs, and the like), the light emitting element Z1 to be driven, and the switch circuit 400, or may be provided as single IC chips (the light emitting element driver ICs 110 to 130) as semi-products independent of the external components (the output capacitor Co, the capacitor C1, the coil L1, the sense resistor Rs, and the like), the light emitting element Z1 to be driven, and the switch circuit 400.

In addition, the light emitting device of each embodiment described above can be used also as a backlight of a display device, for example.

<Other Variations>

Although the structure using the light emitting diode as the light emitting element is exemplified in the embodiments described above, the present invention is not limited to this structure but can use an organic electro-luminescence (EL) element as the light emitting element, for example.

In addition, the various technical features described in this specification can be modified variously besides the embodiment described above within the scope without deviating from the spirit of the technical creation. For instance, it is arbitrary to replace between a bipolar transistor and a MOS field-effect transistor or to invert logic levels of various signals. In other words, the embodiments described above are merely examples in every aspect and should not be interpreted as limitations. The technical scope of the present invention is defined not by the above description of the embodiments but by the claims, which should be interpreted to include all modifications within meanings and ranges equivalent to the claims.

SUMMARY

The light emitting element driving device described above includes a reset signal generator arranged to generate a reset signal in accordance with current flowing in a load including a series connected body constituted of a plurality of light emitting elements and short-circuiting switches disposed respectively in parallel with the light emitting elements of the series connected body, a set signal generator arranged to generate a set signal in accordance with an anode voltage of the load, an output voltage supply unit arranged to generate an output voltage from an input voltage in accordance with the reset signal and the set signal so as to supply the output voltage to the load, a determination unit arranged to determine whether or not a ground fault due to abnormality may have occurred on the basis of the anode voltage of the load, and a signal output unit arranged to externally output a signal indicating that a ground fault due to abnormality may have occurred when the determination unit determines that a ground fault due to abnormality may have occurred, in which the output voltage supply unit does not perform generation stop of the output voltage by a trigger of determination by the determination unit that a ground fault due to abnormality may have occurred (First structure).

Further, in the light emitting element driving device having the first structure, it is possible to adopt a structure in which an average value of current flowing in the load is set to be smaller in a case where the determination unit determines that a ground fault due to abnormality may have occurred than in a case where the determination unit determines that there is no possibility of a ground fault due to abnormality (Second structure).

In addition, in the light emitting element driving device having the first or the second structure, it is possible to adopt a structure in which the determination unit includes a variable voltage source, and a comparator arranged to compare an output voltage of the variable voltage source with the anode voltage of the load (Third structure).

In addition, in the light emitting element driving device having any one of the first to the third structures, it is possible to adopt a structure in which the output voltage supply unit includes an upper transistor and a lower transistor connected in series between an application terminal of the input voltage and the ground terminal, so that a connection node thereof is connected to an output capacitor via a coil, an upper driver and a lower driver arranged to generate drive control signals of the upper transistor and the lower transistor, and a controller arranged to drive the upper driver and the lower driver so as to turn on and off the upper transistor and the lower transistor in accordance with the reset signal and the set signal (Fourth structure).

In addition, in the light emitting element driving device having any one of the first to the fourth structures, it is possible to adopt a structure in which the set signal generator includes a current generator arranged to generate current corresponding to the anode voltage of the load, a charge part arranged to charge the current generated by the current generator, and a comparator arranged to generate the set signal in accordance with a comparison result between a charge voltage of the charge part and a reference voltage (Fifth structure).

In addition, the light emitting device described above includes the light emitting element driving device according to any one of the first to the fifth structures, and a load driven by the light emitting element driving device, in which the load includes a series connected body constituted of a plurality of light emitting elements and short-circuiting switches disposed respectively in parallel with the light emitting elements of the series connected body (Sixth structure).

Further, in the light emitting device having the sixth structure, it is possible to adopt a structure in which the light emitting elements are light emitting diodes or organic EL elements (Seventh structure).

In addition, the light emitting device having the seventh structure may have a structure used as an in-vehicle lamp (Eighth structure).

In addition, the light emitting device having the eighth structure may have a structure mounted in a vehicle as one of a headlight module, a turn lamp module, and a rear lamp module (Ninth structure).

In addition, the vehicle described above has a structure including the light emitting device according to the eighth or the ninth structure (Tenth structure).

In addition, in the vehicle having the tenth structure, it is possible to adopt a structure in which the light emitting device is used as at least one of a headlight, a daytime and night running lamp, a tail lamp, a stop lamp, and a turn lamp (Eleventh structure).

What is claimed is:

1. A light emitting element driving device comprising:
   a reset signal generator arranged to generate a reset signal in accordance with current flowing in a load including a series connected body constituted of a plurality of light emitting elements and short-circuiting switches disposed respectively in parallel with the light emitting elements of the series connected body;
   a set signal generator arranged to generate a set signal in accordance with an anode voltage of the load;
   an output voltage supply unit arranged to generate an output voltage from an input voltage in accordance with the reset signal and the set signal so as to supply the output voltage to the load;
   a determination unit arranged to determine whether or not a ground fault due to abnormality may have occurred on the basis of the anode voltage of the load; and
   a signal output unit arranged to externally output a signal indicating that a ground fault due to abnormality may have occurred when the determination unit determines that a ground fault due to abnormality may have occurred, wherein
   the output voltage supply unit does not perform generation stop of the output voltage by a trigger of determination by the determination unit that a ground fault due to abnormality may have occurred.

2. The light emitting element driving device according to claim 1, wherein an average value of current flowing in the load is set to be smaller in a case where the determination unit determines that a ground fault due to abnormality may have occurred than in a case where the determination unit determines that there is no possibility of a ground fault due to abnormality.

3. The light emitting element driving device according to claim 1, wherein the determination unit includes a variable voltage source and a comparator arranged to compare an output voltage of the variable voltage source with the anode voltage of the load.

4. The light emitting element driving device according to claim 1, wherein the output voltage supply unit includes
   an upper transistor and a lower transistor connected in series between an application terminal of the input voltage and the ground terminal, so that a connection node thereof is connected to an output capacitor via a coil,
   an upper driver and a lower driver arranged to generate drive control signals of the upper transistor and the lower transistor, and
   a controller arranged to drive the upper driver and the lower driver so as to turn on and off the upper transistor and the lower transistor in accordance with the reset signal and the set signal.

5. The light emitting element driving device according to claim 1, wherein the set signal generator includes
   a current generator arranged to generate current corresponding to the anode voltage of the load,
   a charge part arranged to charge the current generated by the current generator, and
   a comparator arranged to generate the set signal in accordance with a comparison result between a charge voltage of the charge part and a reference voltage.

6. A light emitting device comprising:
   the light emitting element driving device according to claim 1; and
   a load driven by the light emitting element driving device, wherein
   the load includes a series connected body constituted of a plurality of light emitting elements and short-circuiting switches disposed respectively in parallel with the light emitting elements of the series connected body.

7. The light emitting device according to claim 6, wherein the light emitting elements are light emitting diodes or organic EL elements.

8. The light emitting device according to claim 7, wherein the light emitting device is used as an in-vehicle lamp.

9. The light emitting device according to claim 8, wherein the light emitting device is mounted in a vehicle as one of a headlight module, a turn lamp module, and a rear lamp module.

10. A vehicle comprising the light emitting device according to claim 8.

11. The vehicle according to claim 10, wherein the light emitting device is used as at least one of a headlight, a daytime and night running lamp, a tail lamp, a stop lamp, and a turn lamp.

* * * * *